United States Patent [19]

Gilbert

[11] 3,710,135
[45] Jan. 9, 1973

[54] ALTERNATING AND DIRECT CURRENT TRANSFORMER USING HARMONIC MODULATOR

[75] Inventor: Roswell A. Gilbert, New York, N.Y.

[73] Assignee: Technical Management Services, Inc., Westfield, N.J.

[22] Filed: Jan. 15, 1971

[21] Appl. No.: 106,779

[52] U.S. Cl. .................. 307/88 R, 332/12, 332/51 R
[51] Int. Cl. ....... H03c 1/10, H03k 7/02, H03k 17/80
[58] Field of Search ...... 307/88 R; 340/174 R; 330/8; 336/212, 214, 215; 332/12, 29 M, 51 R

[56] References Cited

UNITED STATES PATENTS

| 2,997,667 | 8/1961 | Gilbert | 332/51 R |
| 3,080,549 | 3/1963 | Rubens | 340/174 R |

*Primary Examiner*—James W. Moffitt
*Attorney*—Curtis, Morris & Safford

[57] ABSTRACT

The harmonic modulator, preferably a single-core second harmonic modulator, is made into a transformer capable of transforming both alternating and direct currents by the use of two output windings on the core, a "drive" winding and a "sense" winding. A high-gain amplifier is connected to the drive and sense windings in a first feed-back loop to quickly balance and maintain the voltage across the sense winding at zero, and to thus maintain the rate of change of flux in the core at zero. A second feed-back loop detects the second harmonic content of the output signal from the core, and feeds a signal back to the amplifier to balance out flux caused by very low frequency or direct current input signals. The modulator preferably uses a spiral tape magnetic core whose ends are connected together to form a short-circuited secondary winding for an energizing transformer. The end connection preferable passes through the core laminations so as to avoid unbalancing the device.

22 Claims, 12 Drawing Figures

PATENTED JAN 9 1973   3,710,135

INVENTOR
ROSWELL W. GILBERT

BY Curtis, Morris & Safford
ATTORNEYS

INVENTOR
ROSWELL W. GILBERT
BY
Curtis, Morris & Safford
ATTORNEYS

ALTERNATING AND DIRECT CURRENT TRANSFORMER USING HARMONIC MODULATOR

This invention relates to magnetic devices, and particularly to magnetic frequency converters and harmonic modulators, and to current transformers utilizing such magnetic devices.

Balanced magnetic harmonic generators and modulators, such as second harmonic modulators, usually have two magnetic cores with at least one pair of windings connected in opposition to one another. As is well known, an alternating exciting signal is applied to one of the windings on each of the cores, and a d-c modulating signal is applied to another pair of windings. The exciting current having the fundamental frequency is cancelled in the two opposed windings, and the only net output signals are those comprising even harmonics of the fundamental frequency. The second harmonic frequency is predominant and is used in various ways. For example, the second harmonic signal can be used to represent the d-c signal, thus enabling the use of drift-free alternating current amplifiers to amplify the d-c signal. This and other uses and forms of the device related to this invention are described in prior literature such as "Magnetic-Amplifier Circuits" p.p. 219–232, by William A. Geyger, McGraw-Hill, New York, N.Y., 1954; "DC Current-Comparator Potentiometers and Bridges," Bulletin 6911 of Guildline Instruments, Ltd., Smith Falls, Ontario, Canada; "Non-Linear Magnetic Control Devices," William A. Geyger, McGraw-Hill, 1964; U.S. Pat. Nos. 3,500,171 and 3,484,691, and in references cited in the foregoing literature.

One of the more persistent problems which reduce the desirability of such harmonic generators and modulators is the fact that two cores are required and, if any substantial degree of sensitivity is required, the characteristics of the two cores must be closely matched. That is, the two cores must be nearly identical in their magnetization characteristics, as affected by temperature changes, aging, excitation levels, etc. Otherwise, an excessive amount of excitation and error signal will appear in the output signal. The requirement for precise core matching is extremely undesirable in that it greatly adds to the manufacturing time and cost for the device. Various single-core modulators have been proposed by others in the past, but such modulators have not met with widespread acceptance because of complexity of construction or for other reasons.

In my U.S. Pat. No. 2,997,667 is shown a modulator which overcomes the foregoing problems, and avoids the need for two separate cores. That modulator will be discussed in detail below, and is used in the preferred embodiment of the invention.

It is an object of the present invention to provide a transformer, specifically a current transformer, which is capable of transforming both alternating input signals as well as direct input signals. It also is an object to provide such a device which is relatively simple and rugged in construction and yet has a high degree of precision, stability and reliability.

Another object of the present invention is to provide a magnetic harmonic generator and modulator of the type shown in my above-identified patent which is of relatively simple and compact construction.

In accordance with the present invention, the foregoing objects have been met by the provision of an active A.C. transformer with means for operating the transformer as an even harmonic modulator and utilizing the even harmonic signal produced by the modulator to compensate for deviations of the net flux level in the core from a zero level. Preferable, the transformer and the modulator are formed by an improved single-core modulator of the type described above. Preferably, the circuit of the device includes two feedback loops. A first feed-back loop balances the core flux rate-of-change to zero in response to alternating input signals, and a second feed-back loop uses the output of the second harmonic modulator to balance the slow core flux changes caused by direct or very low frequency input currents. Thus, the device is operable with either a-c or d-c input signals, or with both simultaneously. The device preferably uses a spiral tape-form magnetic core whose ends are connected together in an improved manner to simplify the construction of the modulator.

The foregoing and other objects and advantages will be pointed out in or apparent from the following description and drawings. In the drawings:

FIG. 1 is a schematic diagram of the harmonic generator and modulator shown in my U.S. Pat. No. 2,997,667;

GENERAL DESCRIPTION-MODULATOR

Figure 1:
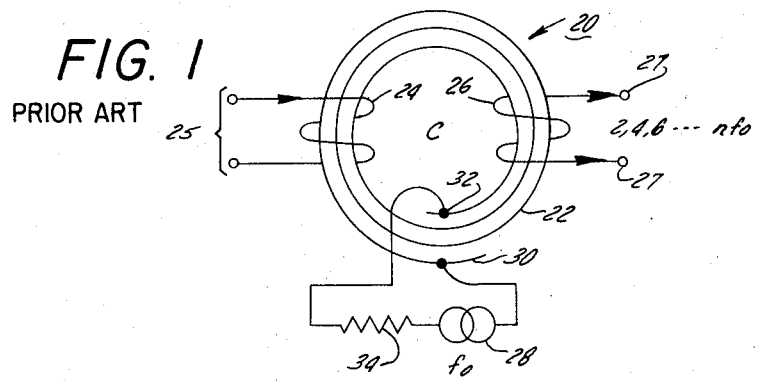

FIG. 1 shows a simple embodiment 20 of the modulator shown in my U.S. Pat. No. 2,997,667. The device 20 will be referred to, for the sake of convenience, as a "modulator," although it should be understood that it can be used for several different purposes; e.g., the device 20 can be used as a frequency multiplier, a harmonic generator, a direct-to-alternating current converter, etc.

The modulator 20 includes a toroidal core 22, an input winding 24, and an output winding 26. Also provided is a source 28 of alternating exciting current which is connected to the core 22 through a resistor 34. The core 22 is a spirally wound tape of high permeability magnetic material such as supermalloy. The tape has outer and inner ends 30 and 32 to which the terminals of the exciting current source 28 are connected. The terminals 25 of the input windings 24 serve as the input terminals of the device 20, and the terminals of the output winding 26 are the output terminals of the device. The harmonic signal in the output winding 26 will be referred hereinafter as the "carrier" signal, and the input signal will be called the "modulating" signal, in analogy to the familiar carrier and modulating signals in radio communications.

In the arrangement shown in FIG. 1, the exciting current flows longitudinally through the conductive tape of the core 22. When a direct current input signal is applied at the terminals 25, an alternating current appears at the output terminals 27 which comprises even harmonics of the fundamental excitation frequency $f_o$. The output signal contains predominantly the second harmonic of the fundamental exciting current.

Figure 3:
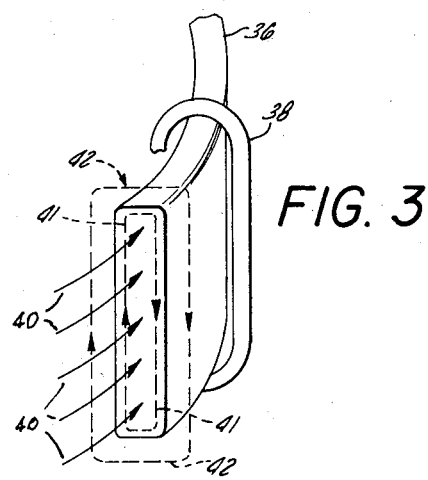
FIG. 3 is a partially perspective schematic view illustrating one of the operational features of the device shown in FIG. 1.

FIG. 3 is a perspective view of a short section 36 of core tape material, together with a portion 38 of a loop of wire wound around a core as part of a winding. The arrows 40 indicate the direction of flow of exciting current through the tape 36; a direction perpendicular to the plane of the loop 38. The shape of the magnetic field created within the conductive tape material by this current flow is indicated generally by the dashed line 41. Most of the flux is confined within the high-permeability tape material. The relatively small amount of flux outside of the tape creates a field whose shape is indicated by the dashed line 42. Both flux flow paths 41 and 42 have shapes approximating that of the turn of wire 38. Thus, the magnetic flux is everywhere substantially parallel to the loops of wire extending around the core so that this flux does not induce any substantial net e.m.f. in the windings. Although e.m.f.'s may develop locally, they are cancelled by equal and opposite e.m.f.'s elsewhere.

Although the current and flux relationships have been shown for only one section 36 of the tape, it should be understood that substantially the same patterns are produced in and around the complete core 22 having several layers of tape wound together. Thus, the flux produced by the exciting current induces substantially no net e.m.f. in the input or output windings of the modulator 20.

Although the flow of alternating current in the core 22 does not induce any significant voltages in the windings, it does create changes in the permeability of the core material. These changes in permeability have been found to create even harmonic output signals quite similar to those produced by a two-core second-harmonic modulator, even though the modulator of this invention operates in a significantly different manner.

Figure 10:
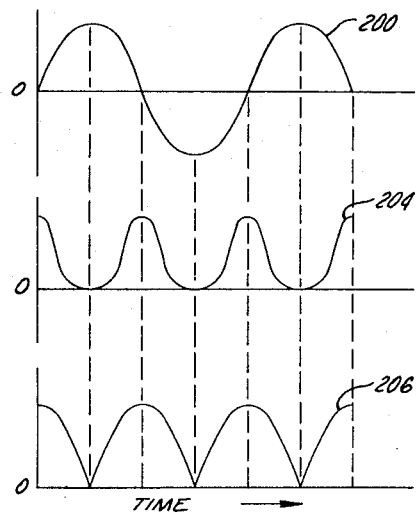
FIG. 10 is a waveform diagram illustrating certain operational features of the device shown in FIG. 1.

FIG. 10 shows the relationships believed to exist between exciting current, output current and core permeability in the device shown in FIG. 1. The curve 200 represents the exciting current, the curve 204 represents the core permeability, and the curve 206 represents the output current on winding 26. It can be seen that the permeability goes through two cycles of change for each cycle of exciting current. Therefore, the output current, which is a function of core permeability, also goes through two cycles during each cycle of the exciting current. Thus, the output current is very rich in second harmonic signal content.

The modulator 20 is highly advantageous in that it requires only one core and has no core matching problems such as those encountered with the usual two-core modulator. Furthermore, the output signal is richer in second harmonic content than the usual two-core modulator. Unexpectedly, it also has been found that the device 20 is relatively free from hysterisis effects; that is, when the d-c input to the device is changed and then returned to its initial level, the output signals return much more closely to their initial levels. It is believed that this unexpected effect is produced by the fact that the current flows and, consequently, the permeability of the tape material is changed, mostly in the outer regions of the cross-section of the tape. This appears to be a type of "skin-effect" whereby flux modulation takes place in a relatively small amount of core material. The flux density change in such material is greater, with the result that hysteresis effects are substantially lower than otherwise might be expected.

INDUCTIVE CORE EXCITATION

The arrangement shown in FIG. 1 in which the core is directly connected to the source 28 of exciting current has simplicity as one of its principal advantages. However, the insulation between the layers of tape in the core may be subject to small short-circuits which may cause inter-turn currents due to resistive voltage drop through the core tape. Therefore, the arrangement shown in FIG. 2 of the drawings is provided in order to energize the core 22 symmetrically and thereby avoid this sort of imbalance despite inter-turn short circuits.

Figure 2:
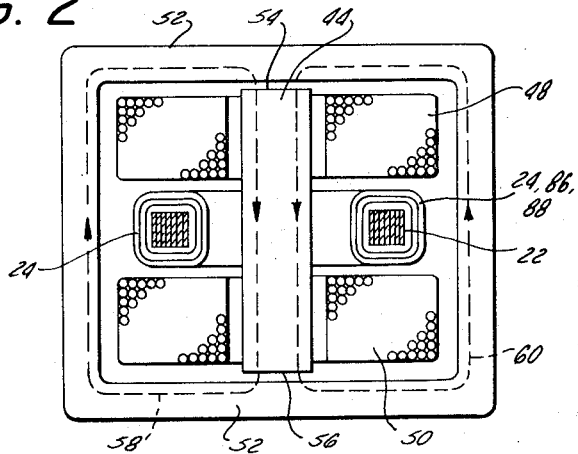
FIG. 2 is a partially schematic and partially cross-sectional view of another embodiment of the device shown in FIG. 1.

In the arrangement shown in FIG. 2, the ends 30 and 32 of the tape forming the core 22 are electrically connected together, and the core 22 encircles a magnetic core 44 of an exciting transformer. Thus, the core 22 forms a short-circuited secondary winding around the core 44. The exciting transformer also includes a pair of primary windings 48 and 50 located symmetrically with respect to the core 22, its windings 24, 86 and 88, and the core 44. An outer housing 52 of magnetically permeable material forms a flux return path and completes the structure. Two narrow gaps 54 and 56 are provided between the ends of the core 44 and the housing 52 so that an electrical short-circuit path is not provided by the core 44 and the housing 52. The flux flow paths are indicated by the dashed lines 58 and 60.

Figure 8:
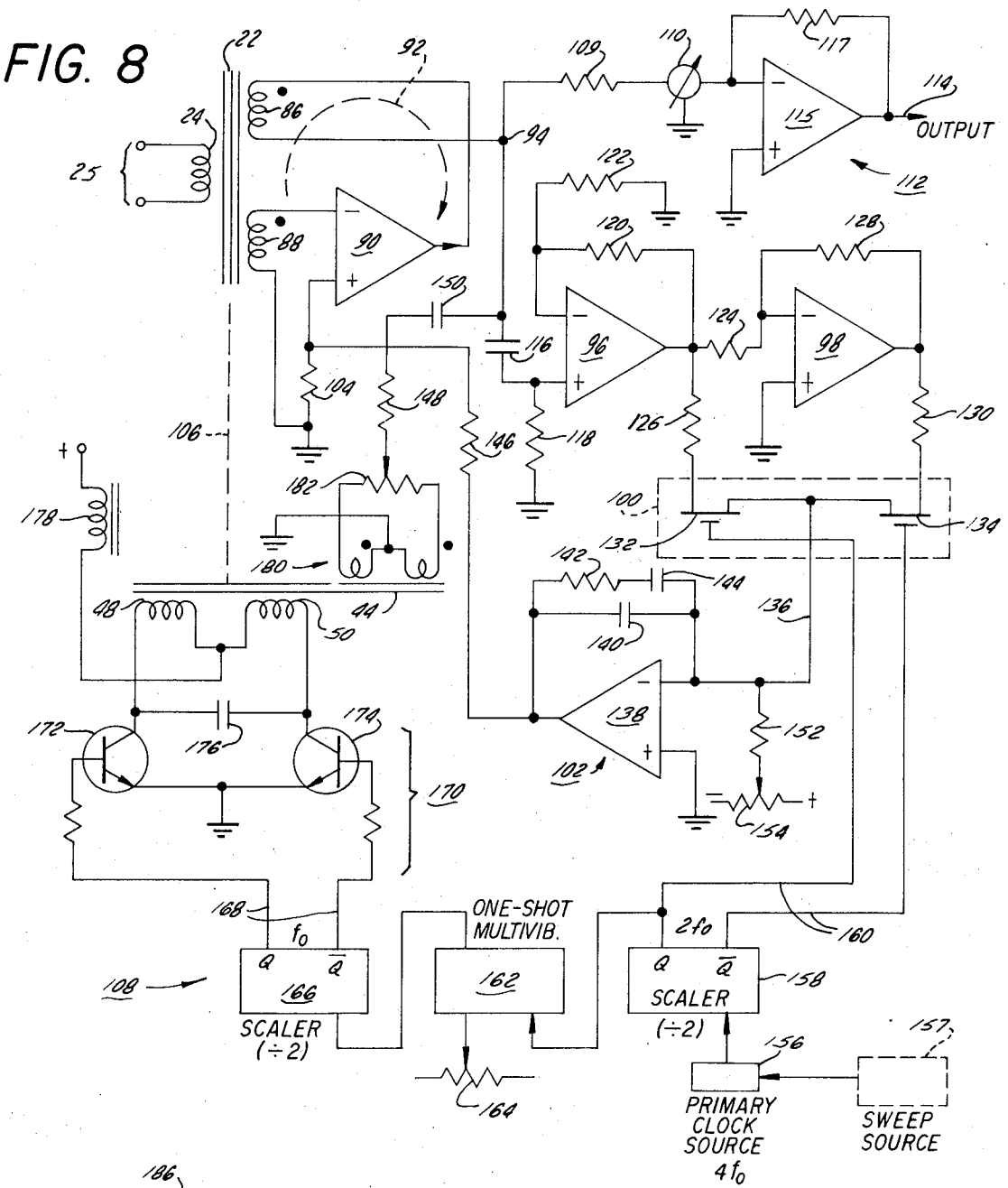
FIG. 8 is a schematic circuit diagram of a current transformer of the present invention.

As is shown in detail in FIG. 8, the primary windings 48 and 50 are connected in series and are energized from a source of exciting current. Since the core 22 is, in effect, a short-circuited secondary turn in the exciting transformer, exciting current is induced in the core material. However, unlike the arrangement shown in FIG. 1, this arrangement produces symmetrical current flow through the core 22 since the e.m.f.'s are induced symmetrically around the length of the core path. This avoids the possible imbalances which might occur in the device of FIG. 1.

Figure 4:
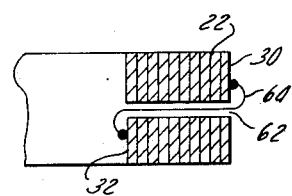
FIGS. 4 through 6 illustrates a separate embodiment of the invention.
Figure 5:
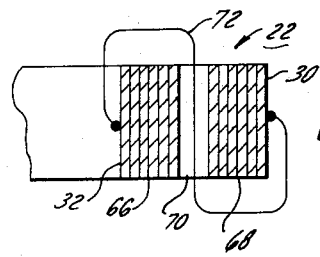
Figure 6:
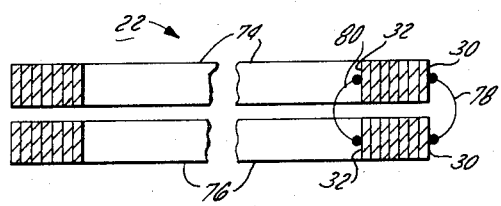

Each of FIGS. 4, 5 and 6 shows a different structure for connecting the ends 30 and 32 of the tape of the core 22 together without creating a fractional turn around the core which would cause imbalance.

In the arrangement shown in FIG. 4, a small hole 62 is drilled through the center of the tape in the direction perpendicular to the central axis of the tape coil. Then a wire 64 is passed through the hole 62 and is connected, as by welding or soldering, to the surfaces 30 and 32. Since the wire 64 passes through the center of the core material, substantially no flux "cuts" across the wire 64, so that there are substantially no induced e.m.f.'s in it.

In the arrangement shown in FIG. 5, the connecting conductor 72 is a length of thin, conductive tape. The stack of tape layers is parted slightly at 70 in the center, and the tape 72 is inserted through the opening. The ends of the tape segment 72 are connected to the surfaces 30 and 32. The e m.f.'s induced in the segment of wire 72 extending between the hole 70 and the end 32 of the tape are cancelled by equal and opposite e.m.f.'s in the portion extending between the hole 70 and the other tape end 30.

In the arrangement shown in FIG. 6 there are two separate half-cores 74 and 76, wound in opposite directions. The inner ends 30 of the two half-cores are connected together by a conductor 78, and the outer ends 32 are connected by another conductor 80. Thus, the two half-cores are connected in series. Any e.m.f.'s induced in one of the connecting conductors will be balanced by equal and opposite e.m.f.'s developed in the other connecting conductor.

Figure 7:
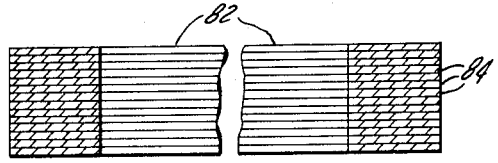
FIG. 7 illustrates another embodiment of the device shown in FIG. 1.

It should be understood that other forms of cores can be used. For example, FIG. 7 shows a stack of annular discs 84 which are stacked together to form a toroidal core 82. Since the discs 84 form a continuous conducting ring, none of the special end connections of FIGS. 4 through 6 is required in order to make the core into a short-circuited secondary turn for the exciting transformer.

A laminated core is preferred over a solid core in order to minimize eddy current losses. The wound tape core is preferred over other forms additionally because it is one of the most readily available cores using high permeability materials. The electrical conductivity of the tape material should be sufficient to require no more than a reasonable amount of exciting power.

GENERAL DESCRIPTION — CURRENT TRANSFORMER

FIG. 8 is a schematic circuit diagram showing the use of the modulator described above as a part of a current transformer which is capable of transforming either alternating or direct input currents, or a combination of both alternating and direct input currents, with a high degree of precision.

In the current transformer shown in FIG. 8, the modulator core 22 has the input winding 24 and two output windings 86 and 88 wound upon it. The winding 86 is termed a "drive" winding, and the other winding 88 is termed a "sense" winding. The drive and sense windings 86 and 88 are connected together with a high-gain operational differential amplifier 90 to form a first feed-back loop indicated by the dashed arrow 92. This feed-back loop is used, as in a conventional "active" transformer, to maintain the voltage on the sense winding 88 substantially at zero, and thus to maintain the net flux rate-of-change in the core 22 substantially at zero. Any signal which is developed in the sense winding 88 due to a change in the core flux is amplified by the amplifier 90 and fed back to the drive winding 86 in a sense to limit the flux change, and the net a-c flux in the core is maintained at zero. This feed-back loop 92 operates very rapidly and, therefore, acts to counteract the effects of relatively high frequency input signals or transient signals with fast rise times. Thus, the device operates as a current transformer for alternating and transient currents. A current signal proportional to the a-c input current can be read by means of a meter 110 connected to the output terminal 94 of the transformer.

The flux changes created by d-c or very low frequency a-c signals are compensated for by a second feed-back loop which includes a pre-amplifier 96, a phase-splitting amplifier 98, a detector circuit 100, and an integrator circuit 102 whose output is applied through a resistor 146 across a resistor 104 to the non-inverting(+) input terminal of the amplifier 90. This second feed-back loop utilizes the second harmonic signal developed by the device in its operation as a harmonic generator to create a d-c bias signal which, when applied to the amplifier 90, balances out flux changes in the core 22 due to d-c or very low frequency a-c input signals. Thus, the current transformer shown in FIG. 8 is capable of operating with either a-c input signals, or d-c input signals, or a combination of both types of signals.

The output of the current transformer either can be read on the meter 110, or can be converted into a voltage signal by means of a current-to-voltage converter circuit 112. In the later case, the voltage signal appears on the output lead 114 of a high-gain operational differential amplifier 115 with a gain-setting feed-back resistor 117.

Now considering the second feed-back loop in greater detail, the even harmonic "carrier" signal (predominantly second harmonic signal) appearing at output terminal 94 is delivered through a blocking capacitor 116 to the input of the operational differential amplifier 96 which amplifies the carrier signal. The resistors 118, 120 and 122 merely set the gain level of the amplifier 96, as is well known in the prior art.

The output signal of the pre-amplifier 96 is delivered to a phase-splitting circuit including resistors 124 and 128 and the operational amplifier 98 which acts as an inverter. Thus, the signals delivered through resistors 126 and 130 are 180° out of phase with one another. These signals are delivered to the detector circuit 100, which includes two field effect transistors 132 and 134, one of which receives the uninverted carrier signals, and the other of which receives the inverted carrier signals.

The operation of the detector circuit 100 is controlled by an a-c supply circuit 108. The gates of transistors 132 and 134 are connected through leads 160 to a scaling flip-flop 158 which scales down (reduces the frequency) of a signal from the primary clock source 156 and delivers an output signal across the leads 160 which is twice the fundamental frequency ($2f_o$) of the exciting current. In other words, the signal delivered to the gate leads of the field effect transistors is at the second harmonic frequency. The field effect transistors 132 and 134 act as a full wave synchronous rectifier for the carrier signal.

The rectified output signal of the detector 100 is delivered over a lead 136 to the input of the integrator circuit 102. The integrator circuit 102 includes a high-gain operational differential amplifier 138 with a feedback circuit including an integrating capacitor 140. This circuit acts as an integrator with a relatively large constant, to give the carrier feed-back loop a relatively long period, e.g. 1 or 2 seconds. Moreover, the integrator 102 is a holding integrator; that is, its output signal will remain at a proper balancing level when the detector output is zero. Thus, the carrier signal is amplified, phase split, detected and converted into d.c., and is used to drive the integrator 102 to a level such as to apply a corrective signal to the amplifier 90 which reduces the carrier signal to zero and thus reduces the flux in the core 22 to zero.

The circuit including the amplifier 90 and the transformer windings 86 and 88 essentially is a free, inductively coupled integrator. Thus, the carrier feed-back loop includes two cascaded integrators which ordinarily would be an unstable combination. This source of possible instability is avoided by the provision of a series-connected resistor 142 and capacitor 144 connected in parallel with the integrating capacitor 140 which introduces a loss factor in the integrator 102 which avoids the possible instability.

A d-c voltage is applied to the ends of a potentiometer 154 whose wiper arm is connected to the lead 136 through a resistor 152 to provide for a trim adjustment to compensate for offset which might occur in the circuit.

The exciting transformer is supplied with exciting current at the fundamental frequency ($f_o$) by means of a circuit which includes a one-shot multivibrator 162 with a phase trim potentiometer 164, whose output is connected to another scaling flip-flop 166 which divides the frequency of the signal it receives by two. Thus, the output signal appearing on output leads 168 of the flip-flop 166 has the fundamental frequency $f_o$. The one-shot multivibrator 162 and the potentiometer 164 are provided in order to adjust the phase of the fundamental with respect to the second harmonic so that the carrier will be in phase with the detector.

The fundamental signal on leads 168 is applied to a class C-operated amplifier 170 which includes two transistors 172 and 174 connected in a push-pull circuit with the exciting transformer windings 48 and 50. The common terminal between the windings 48 and 50 is connected to a d-c source through a smoothing choke 178. A capacitor 176 is connected between the opposite ends of the windings 48 and 50. The capacitor 176 has a value such that it resonates the inductance of the exciting transformer to the fundamental frequency ($f_o$). This is desirable because it produces a load with zero power factor for the amplifier 170. Operation of the amplifier in the class C mode maximizes the efficiency of the amplifier. The wave-form of the current in the winding at the exciting transformer is approximately sinusoidal.

Inductive coupling between the core 44 and the core 22 is indicated schematically by the dashed arrow 106. The actual physical relationship of the cores and their coils is shown in FIG. 2 and has been explained above.

Ordinarily, very little current having the fundamental frequency is developed in the drive winding 86 of the current transformer. Nonetheless, whatever fundamental current there might be in the drive winding is cancelled by a signal conducted through a blocking capacitor 150 and a resistor 148 from a potentiometer 182 which is connected across a pair 180 of series-connected secondary trim windings on the core 44. The trim signal is input to the amplifier 96 in a sense opposite to the residual $f_o$ signal.

The primary clock source 156 should produce pulses which recur at precisely regulated time intervals. A crystal oscillator or one of a number of known oscillator circuits using integrated operational amplifiers can be used as a clock source. By dividing the frequency of the primary clock in the scaler 158 and in the second scaler 166, the likelihood that spurious even harmonic signals will occur in the exciting signal is minimized.

FREQUENCY RANGE OF INPUT SIGNALS

The current transformer shown in FIG. 8 is capable of transforming both a-c and d-c signals, or a combination of both, as has been described above. However, with alternating input signals whose frequency is near one of the even multiplies of the fundamental frequency ($f_o$), the system may be rendered inoperative. For example, in a device which was built in accordance with the circuit diagram of FIG. 8 and was successfully tested, the fundamental frequency was approximately 240 Hz. With a-c input signals of a frequency approximating 480 Hz., 960 Hz., etc. the circuit was inoperative. In many uses, this is not a problem because the input frequencies do not include these frequencies. However, if this situation is a problem, it can be solved rather easily.

One solution is to simply vary or "sweep" the fundamental frequency continuously. This variation of the fundamental frequency prevents imbalance in the circuit because the even harmonics of the fundamental also are varied. Because the carrier feed-back loop has a relatively long time constant, the input signals at or near the even harmonic frequency do not have time to create a d-c imbalance in the system for the short time during which the frequency of the input signals is near one of the even harmonics.

Referring again to FIG. 8, the frequency of the clock source 156 is varied or "swept" quite simply by the connection of an a-c source as an input to the clock source 156. In a circuit which was successfully tested, the source 157 produced an output signal at a frequency of about 10 cycles per second which swept the fundamental frequency $f_o$ over a range from approximately 170 to 240 hertz, at a rate of 10 times per second.

CURRENT TRANSFORMER USING MULTI-CORE MODULATOR

Figure 9:
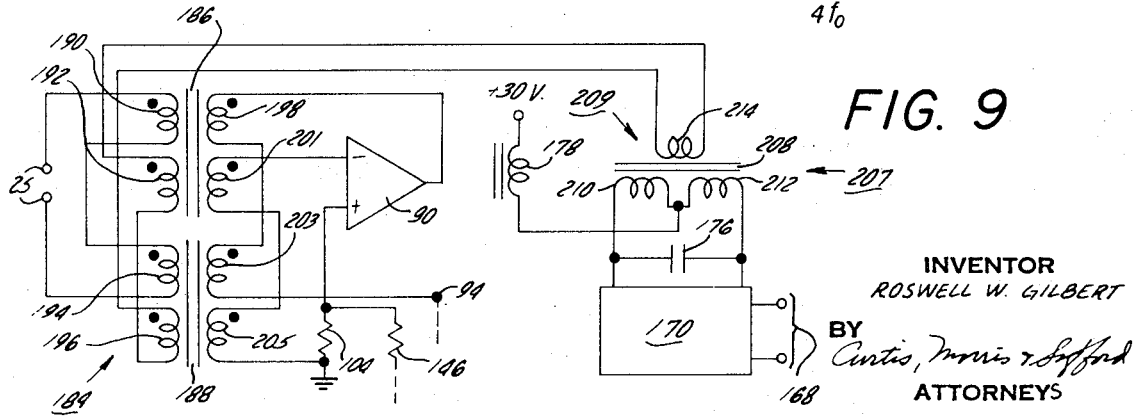
FIG. 9 is a schematic circuit diagram of a modification of the circuit shown in FIG. 8.

FIG. 9 illustrates an alternative embodiment of the current transformer of the present invention. This current transformer utilizes the same principles of operation as the one shown in FIG. 8, but replaces the single core modulator with a conventional two-core modulator. Corresponding components in the two systems bear the same reference numerals. The entire circuit is not shown in FIG. 9; only the components which are changed.

The two-core modulator 184 includes two matched cores 186 and 188 with a pair of series-connected input windings 190 and 194, and a pair of exciting windings 192 and 196. The windings 190 and 194 are connected in series-aiding relationship, and windings 192 and 196 are connected in series-opposition so that the fundamental flux developed in the two cores is cancelled out.

Two series-connected secondary drive windings 198 and 203 are provided, one for each core 186 and 188. Two secondary sense windings 201 and 205 also are provided and are connected to the feed-back amplifier 90 in the manner shown.

The excitation circuit 207 shown in FIG. 9 uses a conventional transformer 209 in place of the excitation transformer shown in FIG. 8. Otherwise, the excitation circuit 207 is the same that shown in FIG. 8. The transformer 209 has two series-connected windings 210 and 212, and a core 208. The transformer 209 has an output winding 214 which is connected to the series-connected exciting windings 192 and 196.

The mode of operation of the circuit illustrated in FIG. 9 is substantially the same as that shown in FIG. 8, except that the modulator 184 operates in the conventional manner of a two-core modulator, rather than in the more advantageous manner of the single-core modulator of the present invention.

CURRENT TRANSFORMER WITH CENTRAL OPENING

Another embodiment of the current transformer of this invention is one in which a central opening or "window" is left in the modulator core 22 so that the user of the current transformer can insert a current carrying conductor through the window for measurement of currents flowing in the conductor.

One way in which such a window may be provided is simply to use the modulator structure shown in FIG. 1 instead of that shown in FIG. 2. In such a structure, the input winding 24 need not be provided. Instead, the user can insert his current-carrying conductor through the open center portion "C" of the core 22, and the current flowing therein will induce flux in the core 22 despite the absence of an input winding 24. In effect, the current-carrying conductor serves as the input winding. Such a transformer is quite useful as a bushing transformer for very high voltage transmission systems.

For reasons discussed in detail above, often it is preferable to use an exciting structure which introduces the current uniformly along the length of the tape instead of at the ends of the tape as in the FIG. 1 structure. Therefore, the transformer structure shown in FIGS. 11 and 12 is preferred for providing a current transformer with a central opening or "window."

Figure 11:
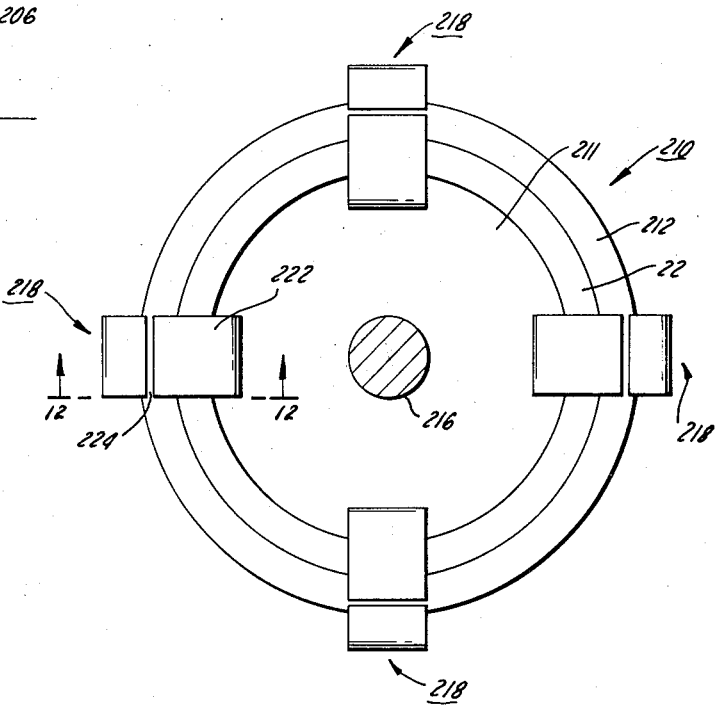
FIG. 11 is a plan view of another embodiment of the current transformer of the present invention.
Figure 12:
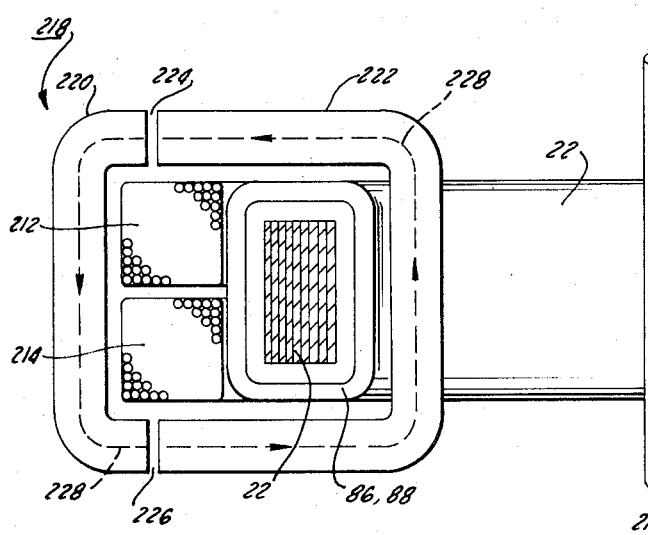
FIG. 12 is a cross-sectional view taken along line 12—12 of FIG. 11.
Figure 12:
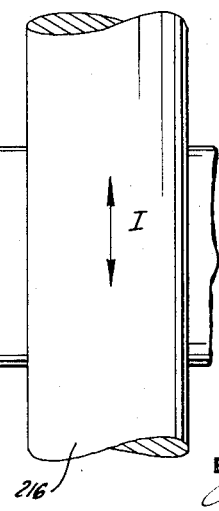

FIGS. 11 and 12 show a current transformer 210 with a central window or opening 211. The transformer is shown in use as a very high-voltage bushing transformer with a current conductor 216 extending vertically through the central opening 211. The conductor 216 is spaced from the current transformer by a relatively large distance in order to prevent breakdown and discharge of the very high voltage on the conductor 216 to the current transformer.

As it is shown in FIG. 12, the toroidal wound tape core 22 and its output windings 86 and 88 are shaped substantially as in the embodiment shown in FIG. 2. Also as in the embodiment shown in FIG. 2, the ends of the tape are connected together so that the core 22 forms a short-circuited secondary winding. However, unlike the FIG. 2 structure, the core 22 forms a secondary turn for each of a plurality of different exciting transformers 218. The transformers 218 are identical to one another. Each transformer 218 includes two C-shaped core members 220 and 222, each of which extends around the magnetic core 22 and its windings 86 and 88, and two exciting windings 212 and 214 which are shared by all of the transformers 218.

Each of the windings 212 and 214 comprises a bundle of conductors wound in an annular shape around the outside of the core 22. The windings 212 and 214 are superimposed one above the other. Two small insulated gaps 224 and 226 are provided between the core pieces 220 and 222 in order to prevent those core pieces from forming a short-circuited turn around the toroidal current transformer. The flux path for the flow of exciting flux is indicated by the dashed line 228. That flux induces exciting current in the core 22 at the fundamental frequency.

Alternatively, the exciting windings can be located inside of the ring-shaped core 22, or one winding can be inside and the other outside of the core 22.

Insulation separates the windings 212 and 214 from one another and from the core 22 and its windings, and also separates the core members 220 and 222. It also should be understood that similar insulation is provided between the components shown in FIG. 2. The insulation has been omitted from FIGS. 2 and 12 for the sake of clarity of the drawings.

In operation, the flow of current through the conductor 216 in one of the directions indicated by the arrow "I" in FIG. 12 induces a modulating signal in the core 22 without the need for a separate input winding. The remainder of the current transformer is as shown in FIG. 8, and its operation is the same as described above.

Advantageously, the current transformer operates precisely even though the circumference of the core 22 must be relatively large, as it often must be as in extremely high-voltage direct or alternating current power transmission systems, or in current busses carrying large currents for use in the electrolytic refining of aluminum. The problem caused by such requirements is that the large conductor cannot be wrapped around the core 22, as a normal winding would be, and, therefore, the current transformer has, effectively, an input winding with only one turn. Since the circumference of the core 22 must be large to go around the large central conductor, the magnetization levels of the core usually are substantially lower than in other current transformer uses. Nonetheless, the current transformer of the present invention offers a high degree of precision; much higher, it is believed, than that which is available in ordinary passive bushing transformers. Furthermore, applicant's transformer has the capability of operation with either a-c or d-c input signals, or a combination of both, as in the other embodiments of the invention.

One of the advantages of the current transformers of the present invention is that they can use, for the most part, relatively inexpensive and imprecise operational differential amplifiers. For example, type 741 integrated differential amplifiers have been used in the circuit of FIG. 8. Despite the use of such commonplace amplifiers, a resolution of the order of 100 nanoampere-turns per centimeter of core length is believed to be readily attainable. Thus, it has been found that the current transformer has quite low offset and high precision, despite the use of such relatively inexpensive components.

The current amplifier is highly advantageous not only in its high precision, but also in the conductive isolation it provides between the current measurement circuit and the input circuit. Thus, the current transformer may find considerable utility in interconnecting many different process control devices with a central computer, for example. Furthermore, when connected in cascade, the transformers avoid the cumulative voltage offset which might be provided by cascaded voltage amplifiers.

The current offset is extremely low. Another advantage of the invention is that all this precision and stability can be provided at a relatively modest cost. There are no expensive core matching problems in manufacturing the modulator, and for the most part, relatively inexpensive components can be used without sacrificing accuracy.

The above description of the invention is intended to be illustrative and not limiting. Various changes or modifications in the embodiments described may occur to those skilled in the art and these can be made without departing from the spirit or scope of the invention.

I claim:

1. A magnetic flux modulator comprising a core of magnetic material, at least one output winding on said core, and energizing means for causing an alternating electrical current to flow in said magnetic core in a director such that the magnetic flux developed by said current develops substantially no net e.m.f. in said winding, an even harmonic detector for detecting the even harmonic content of the signal in said output winding, and means for utilizing the detected signal for balancing the total core flux at substantially zero.

2. A magnetic flux modulator comprising a core of magnetic material, at least one output winding on said core, and energizing means for causing an alternating electrical current to flow in said magnetic core in a direction such that the magnetic flux developed by said current develops substantially no net e.m.f. in said winding, said energizing means including a second magnetic core, alternating current drive and winding means for said second core, the first-named core being wound around said second core as a short-circuited secondary turn, said first core being made of a wound, elongated high-permeability conductive member, and means for conductively connecting the ends of said member together without thereby creating a net fractional turn around said first core, said conductive member being a tape which is coiled to form said core, said core having a hole through it, said hole being in the approximate center of the coiled tape material, and a conductor extending through said hole and interconnecting the ends of said tape.

3. A modulator as in claim 2 in which said hole is substantially orthogonal to the central axis of said coils.

4. A modulator as in claim 2 in which said hole is substantially parallel to the central axis of said coils.

5. A magnetic flux modulator comprising a core of magnetic material, at least one output winding on said core, and energizing means for causing an alternating electrical current to flow in said magnetic core in a direction such that the magnetic flux developed by said current develops substantially no net e.m.f. in said winding, said energizing means including a second magnetic core, alternating current drive and winding means for said second core, the first-named core being wound around said second core as a short-circuited secondary turn, said first core consisting of two elements, each comprising a coiled high-permeability conductive tape member, the direction in which the coils are coiled being opposite, and means for conductively connecting symmetrically the inside ends of said coils to one another and for connecting the outside ends of said coils to one another.

6. A current transformer, said transformer comprising, in combination, a harmonic modulator including transformer means with core means and a pair of secondary windings, balancing means for maintaining the total flux in said core means substantially at zero, said balancing means comprising a high-gain amplifier connected in a first feed-back path between said secondary windings, and detector means for detecting the even harmonic content of the output signal of said harmonic modulator and feeding a corresponding signal back to said amplifier.

7. A transformer as in claim 6 in which said detector means includes means for rectifying the even harmonic output signals of said modulator, holding integrator means for receiving the output of said rectifying means and delivering to said amplifier a flux-correction signal which is a function of the magnitude of said even harmonic output signals.

8. A transformer as in claim 6 including an alternating frequency source of energizing current for said modulator, and means for sweeping the frequency of said source repetitively at a repetition rate different from the frequency of said source.

9. A transformer as in claim 6 in which the time-constant of the first feed-back path is substantially smaller than the time constant of the last-named feed-back path.

10. A transformer as in claim 6 including supply means for supplying alternating exciting current to said modulator core means, said supply means including means for causing said exciting current to flow in said core means in a direction such that no net e.m.f.'s are developed in said windings.

11. A transformer as in claim 6 including a clock source and at least one frequency divider for dividing the frequency of the output of said clock, and means for supplying alternating energizing current to said modulator from said divider.

12. A transformer as in claim 11 in which said detector means includes a synchronous rectifier, and means for deriving from said clock source and applying to said detector means a synchronizing signal at an even multiple of the frequency of the energizing current.

13. A transformer operable to transform both alternating and direct current input signals, said transformer comprising, in combination, an active alternating current transformer together with means for operating said alternating current transformer as an even harmonic modulator and utilizing the even harmonic signal produced by said modulator to compensate for deviations of the net flux level in said core from a zero level.

14. A transformer as in claim 13 in which said active transformer includes a pair of secondary windings and a high-gain amplifier connected therebetween to keep the alternating current-developed flux substantially at zero.

15. A transformer comprising a magnetic core with at least one output winding and amplifier means for maintaining the total core flux at substantially zero, energizing means for supplying alternating exciting current to said core in a direction such that substantially no net e.m.f.'s are developed in said winding, means for detecting harmonic signals in said winding and delivering corresponding signals to said amplifier means.

16. A transformer as in claim 15 in which said energizing means includes a second magnetic core, alternating current drive and winding means for said second core, the first-named core being wound with respect to said second core as a short-circuited secondary turn.

17. A transformer as in claim 16 in which said first core is made of a wound, elongated high-permeability conductive member, and means for conductively connecting the ends of said member together without thereby creating a net fractional turn around said first core.

18. A transformer as in claim 16 in which said first core has the shape of a closed loop, said second core extending through said loop, said winding means comprising a pair of windings spaced symmetrically with respect to said first core.

19. A transformer as in claim 16 in which said first core has a central opening, said second core extending around said first core.

20. A transformer as in claim 19 in which said winding means includes a plurality of windings substantially parallel to said first core and inside of said second core.

21. A transformer as in claim 19 including a plurality of said second cores at spaced intervals along said first core.

22. A current transformer comprising a coiled tape high-permeability first core, a drive and a sense winding on said core, a high-gain amplifier connected to receive flux-induced signals from said sense winding, amplify said signals, and deliver amplified signals to said drive winding to balance changes in net flux in said core, a phase-splitter connected to receive the second harmonic output of said drive winding, a synchronous detector, a holding integrator connected to receive the output of said detector and to deliver its output to said amplifier, a clock source, a first divider for deviding the frequency of said clock source and delivering a second synchronizing signal to said synchronous detector, second divider means for dividing the frequency of said first divider to form a fundamental frequency energizing signal, an exciting transformer for said first core, said exciting transformer including a second core encircling said first core and primary windings energized by said second divider means, said first core forming a short-circuited secondary turn for said exciting transformer and carrying exciting current in the longitudinal direction through said tape.

* * * * *